(12) United States Patent
Bajaj et al.

(10) Patent No.: US 11,250,038 B2
(45) Date of Patent: Feb. 15, 2022

(54) QUESTION AND ANSWER PAIR GENERATION USING MACHINE LEARNING

(71) Applicant: MICROSOFT TECHNOLOGY LICENSING, LLC., Redmond, WA (US)

(72) Inventors: Payal Bajaj, Redmond, WA (US); Gearard Boland, Bellevue, WA (US); Anshul Gupta, Kirkland, WA (US); Matthew Glenn Jin, Seattle, WA (US); Eduardo Enrique Noriega De Armas, Bothell, WA (US); Jason Shaver, Redmond, WA (US); Neelakantan Sundaresan, Bellevue, WA (US); Roshanak Zilouchian Moghaddam, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 657 days.

(21) Appl. No.: 16/101,520

(22) Filed: Aug. 13, 2018

(65) Prior Publication Data

US 2019/0228099 A1    Jul. 25, 2019

Related U.S. Application Data

(60) Provisional application No. 62/619,804, filed on Jan. 21, 2018.

(51) Int. Cl.
*G06F 16/33* (2019.01)
*G06F 16/332* (2019.01)
(Continued)

(52) U.S. Cl.
CPC ...... *G06F 16/3329* (2019.01); *G06F 16/3334* (2019.01); *G06F 16/38* (2019.01);
(Continued)

(58) Field of Classification Search
CPC ...... G06F 16/33; G06F 16/3329; G06F 16/38; G06F 16/3334; G06F 16/951;
(Continued)

(56) References Cited

U.S. PATENT DOCUMENTS

| | | | | |
|---|---|---|---|---|
| 7,225,125 B2 * | 5/2007 | Bennett | ................... | G10L 15/22 704/233 |
| 7,725,307 B2 * | 5/2010 | Bennett | ................... | G06F 40/42 704/9 |

(Continued)

OTHER PUBLICATIONS

Cong, et al., "Finding question-answer pairs from online forums", In Proceedings of the 31st annual international ACM SIGIR conference on Research and development in information retrieval, Jul. 20, 2008, pp. 467-474.

(Continued)

*Primary Examiner* — Hanh B Thai

(57) ABSTRACT

An interactive question and answer (Q&A) service provides pairs of questions and corresponding answers related to the content of a web page. The service includes pre-configured Q&A pairs derived from a deep learning framework that includes a series of neural networks trained through joint and transfer learning to generate questions for a given text passage. In addition, pre-configured Q&A pairs are generated from historical web access patterns and sources related to the content of the web page.

20 Claims, 11 Drawing Sheets

(51) Int. Cl.
  *G06N 3/04* (2006.01)
  *G06N 5/04* (2006.01)
  *G06F 16/38* (2019.01)
  *G06F 16/951* (2019.01)
  *G06N 3/08* (2006.01)

(52) U.S. Cl.
  CPC ......... *G06F 16/951* (2019.01); *G06N 3/0445* (2013.01); *G06N 3/0454* (2013.01); *G06N 3/08* (2013.01); *G06N 5/041* (2013.01); *G06N 3/084* (2013.01)

(58) Field of Classification Search
  CPC ........ G06N 3/0445; G06N 3/08; G06N 5/041; G06N 3/084
  USPC ........................................................ 707/769
  See application file for complete search history.

(56) References Cited

U.S. PATENT DOCUMENTS

| | | | |
|---|---|---|---|
| 8,340,955 B2* | 12/2012 | Brown | G06F 16/3329 704/9 |
| 8,417,514 B2* | 4/2013 | Brown | G06F 40/30 704/9 |
| 9,495,648 B1* | 11/2016 | Boyer | G06F 16/3329 |
| 9,720,981 B1* | 8/2017 | Boguraev | G06F 16/683 |
| 10,009,375 B1* | 6/2018 | Sites | G06F 21/577 |
| 10,152,534 B2* | 12/2018 | Bastide | G06F 16/3329 |
| 10,303,999 B2* | 5/2019 | Hertz | G06F 16/36 |
| 10,387,560 B2* | 8/2019 | Allen | G06F 40/186 |
| 10,388,274 B1 | 8/2019 | Hoffmeister | G06F 16/24522 |
| 10,412,529 B1* | 9/2019 | Dantrey | H04S 7/303 |
| 10,679,011 B2* | 6/2020 | Galitsky | G06N 3/006 |
| 10,692,006 B1* | 6/2020 | Zhang | G06N 20/00 |
| 10,817,790 B2* | 10/2020 | Akolkar | G06N 5/04 |
| 10,853,724 B2* | 12/2020 | Xiao | G06F 40/30 |
| 2005/0080625 A1* | 4/2005 | Bennett | G06F 16/24522 704/249 |
| 2005/0144001 A1* | 6/2005 | Bennett | G06F 40/58 704/252 |
| 2006/0122834 A1* | 6/2006 | Bennett | G10L 15/30 704/256 |
| 2007/0156761 A1* | 7/2007 | Smith | G06F 16/748 |
| 2007/0179789 A1* | 8/2007 | Bennett | G10L 15/30 704/270.1 |
| 2007/0185716 A1* | 8/2007 | Bennett | G06F 40/289 704/270.1 |
| 2007/0185717 A1* | 8/2007 | Bennett | G06F 40/289 704/270.1 |
| 2007/0292833 A1* | 12/2007 | Brodie | H04M 3/5191 434/350 |
| 2008/0059153 A1* | 3/2008 | Bennett | G06F 40/289 704/9 |
| 2008/0201132 A1* | 8/2008 | Brown | G06F 40/30 704/9 |
| 2008/0255845 A1* | 10/2008 | Bennett | G06F 40/30 704/257 |
| 2009/0157401 A1* | 6/2009 | Bennett | G10L 15/30 704/243 |
| 2010/0235343 A1* | 9/2010 | Cao | G06F 16/951 707/710 |
| 2012/0189988 A1* | 7/2012 | Brown | G06F 16/3329 434/156 |
| 2012/0265531 A1* | 10/2012 | Bennett | G10L 15/18 704/254 |
| 2012/0265800 A1* | 10/2012 | Tuchman | H04M 3/51 709/203 |
| 2013/0204815 A1* | 8/2013 | Grothmann | G06N 3/08 706/16 |
| 2015/0227592 A1* | 8/2015 | Govindaraju | G06F 16/2465 707/722 |
| 2016/0133148 A1* | 5/2016 | Hanks | G09B 7/06 434/309 |
| 2016/0180242 A1* | 6/2016 | Byron | G06N 5/041 706/11 |
| 2016/0239592 A1* | 8/2016 | Pourmousavi Kani | G06F 30/20 |
| 2016/0239738 A1* | 8/2016 | Feng | G06F 16/24578 |
| 2017/0004204 A1* | 1/2017 | Bastide | G06F 16/3329 |
| 2017/0140253 A1* | 5/2017 | Wshah | G06N 3/08 |
| 2017/0228768 A1* | 8/2017 | Saxena | G06Q 30/0242 |
| 2017/0293725 A1* | 10/2017 | Liu | G06F 16/24522 |
| 2017/0330079 A1* | 11/2017 | Akolkar | G06N 5/022 |
| 2017/0330087 A1* | 11/2017 | Akolkar | G06F 40/295 |
| 2017/0356976 A1* | 12/2017 | Shapiro | A61B 5/7267 |
| 2018/0005110 A1* | 1/2018 | Gokmen | G06N 3/063 |
| 2018/0082183 A1* | 3/2018 | Hertz | G06F 16/36 |
| 2018/0114114 A1* | 4/2018 | Molchanov | G06N 3/082 |
| 2018/0157741 A1* | 6/2018 | Allen | G06N 5/022 |
| 2018/0181673 A1* | 6/2018 | Liu | G06F 16/3329 |
| 2018/0357220 A1* | 12/2018 | Galitsky | G06F 40/216 |
| 2019/0012594 A1* | 1/2019 | Fukuda | G10L 15/19 |
| 2019/0065576 A1* | 2/2019 | Peng | G06F 16/22 |
| 2019/0163500 A1* | 5/2019 | Daianu | G06N 7/005 |

OTHER PUBLICATIONS

Du, et al., "Learning to Ask: Neural Question Generation for Reading Comprehension", In Journal of Computing Research Repository, Apr. 29, 2017, 11 Pages.

Heilman, et al., "Question generation via overgenerating transformations and ranking", In Technical Report of CMU-LTI-09-013, Jan. 2009, 16 Pages.

Joshi, et al., "TriviaQA: A Large Scale Distantly Supervised Challenge Dataset for Reading Comprehension", In Journal of Computing Research Repository, May 2017, 11 Pages.

Joulin, et al., "Bag of tricks for efficient text classification", In Journal of Computing Research Repository, Jul. 2016, 5 Pages.

Rajpurkar, et al., "SQuAD: 100,000+ Questions for Machine Comprehension of Text", In Journal of Computing Research Repository, Jun. 2016, 10 Pages.

Yuan, et al., "Machine Comprehension by Text-to-Text Neural Question Generation", In Journal of the Computing Research Repository, May 4, 2017, pp. 1-14.

Zhou, et al., "Neural Question Generation from Text: A Preliminary Study", In Journal of the Computing Research Repository, Apr. 2017, 6 Pages.

Ackerman, et al. "Software Inspections: An Effective Verification Process", In Journal of IEEE Software, vol. 6, Issue 3, May 1989, pp. 31-36.

\* cited by examiner

COMMAND LINE INTERACTION 902

904 — $ az ? -q "how do I output in json"
906 — Let me see if I can answer that for you.
Please wait ....

The following example displays the list of virtual machines in your subscription in the default json format.
az vm list –output json

*FIG. 9A*

COMMAND LINE INTERACTION 908

910 — $ az ? -q "create a vm with key vault"
912 — I'm working on finding the right answer for you.
Please wait ....

az keyvault certificate create --vault-name vaultname -n cert1 \
-p "$(az keyvault certificate get-default-policy)"

secrets=$(az keyvault secret list-versions --vault-name vaultname \
-n certa --query "[?attributes.enabled].id" -o tsv)

vm_secrets=$(az vm secret format -s "$secrets")

az vm create -g group-name -n vm-name --admin-username deploy \
--image debian --secrets "$vm_secrets"

For more information please see: https://docs.microsoft.com/en-us/cli/azure/vm#az_vm_create

*FIG. 9B*

QUESTION AND ANSWER PAIR GENERATION USING MACHINE LEARNING

CROSS-REFERENCE TO RELATED APPLICATION

This application claims the benefit of U.S. Provisional Application No. 62/619,804, filed on Jan. 21, 2018, the entirety of which is hereby incorporated by reference.

BACKGROUND

Question generation is directed towards creating natural sounding questions from a given text passage. The questions are often used to facilitate a user's comprehension of the text passage. The questions may also be used to initiate a user into a discussion on the passage, to initiate feedback on the passage, keep the user engaged with a website containing the text passage, and in some cases help the user find other related passages.

The generation of questions by a machine is a complex task since it requires the machine to process and analyze a large volume of natural language text in order to understand the relationships between the various words in a text passage. Rule-based approaches have been used which rely on pre-configured rules to perform the declarative-to-interrogative sentence transformation. An input sentence is transformed into a syntactic representation and then converted into a question based on syntax rules. This approach does not utilize the semantic relationships between words thereby generating non-natural sounding questions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An interactive question and answer (Q&A) service provides supporting information for content associated with a web page and/or website. The supporting information is manifested as a question with a corresponding answer, otherwise known as a Q&A pair. The Q&A pairs are derived from multiple sources including a deep learning framework, a full-text search of various documents related to the web page/web site, pre-configured Q&A pairs based on historical sequences of web page requests and Internet searches. The interactive Q&A service generates Q&A pairs while a user is reading content of a displayed web page as well as respond to user requests for additional information pertaining to the content of the displayed web page.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 9A-9B illustrate exemplary command line interactions.

DETAILED DESCRIPTION

Overview

Figure 1:
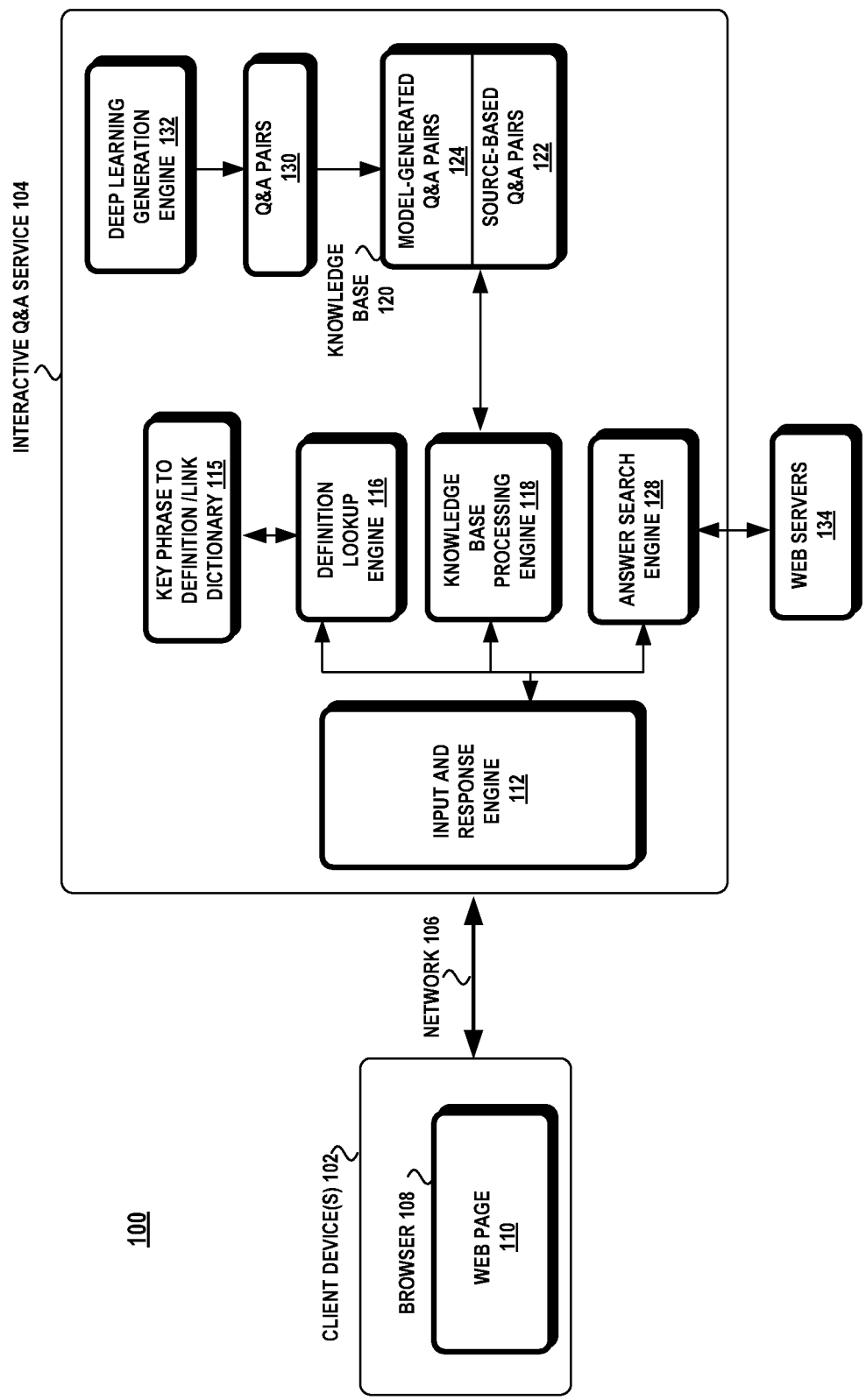
FIG. 1 illustrates an exemplary system of an interactive Q&A service.

The subject matter pertains to an interactive Q&A service that is configured to provide supporting data related to the content of a web page and/or web site. The interactive Q&A service responds to non-query requests and user-initiated queries for the supporting data. The supporting data may be obtained from pre-configured pairs of questions and answers that are associated with the content, from a knowledge base of Q&A pairs generated from a deep learning framework and other text-based content, or through Internet searches.

The interactive Q&A service provides the supporting information in different ways. In one aspect, the interactive Q&A service may receive a non-query request for supporting information associated with a text passage that the user is currently reading. The interactive Q&A service receives the text passage and URL. A key phrase is extracted from the text passage and mapped to a definition and a link. The definition is the answer and the link points to additional information. A "What Is" card is generated with a "What Is" type question, the key phrase, the answer, and the link.

A user-initiated query may be in the form of a "What Is" type question or as another type of question. A "What Is" type question contains an interrogative word or question word, such as without limitation, what, how, can, where, who, which, etc. The other type of question to the "What Is" type of question is one that does not contain an interrogative word.

When the interactive Q&A service receives a user-initiated query in the form of a "What Is" type question, the interactive Q&A service searches for a pre-configured definition and link based on an extracted key phrase from the text of the associated web page. If none is found, an Internet search is made and the results are formulated into a Q&A pair.

For other types of user-initiated queries, the interactive Q&A service performs a full text search on a knowledge base. The other types of user-initiated questions do not contain an interrogative word or question word (e.g., how, can, where, who, which, etc.) The knowledge base includes a dictionary of machine learning model-generated Q&A pairs and source-based Q&A pairs. A full-text search is performed on the knowledge base to find corresponding Q&A pairs. If none are found, an Internet search is performed. The results are formatted as a Q&A pair.

The source-based Q&A pairs in the knowledge base are from various sources such as documentation pages, blogs, feedback from websites, comments from websites and so forth that pertain to the subject matter of the web pages.

The model-generated Q&A pairs may be generated from a deep learning framework having multiple sequence-to-sequence neural networks. Each deep learning model is trained to learn a conditional probability distribution that predicts the likelihood that a question y is more likely to be asked when a given text passage c is read. The questions generated from a respective deep learning model is then paired with its corresponding answer and consolidated into a lookup or dictionary that can be accessed upon demand.

The deep learning framework consists of a first sequence-to-sequence neural network that is jointly trained on a generic dataset of questions, content, and answers at the same time with a target dataset of questions, content, and answers. The generic dataset includes different types of questions, other than "what", such as "when" and "why", and with different contexts than the target text passage. The generic dataset is used to train a deep learning model with the common relationships between the questions, content, and answers. The target dataset includes the "how" questions and the targeted context which provides the particular syntactic and semantic relationships between the questions, context, and answers associated with web pages on a target website. To help the network understands the different parts of speech within the sentences of a particular context, the word embeddings are tagged with parts-of-speech tags.

A second sequence-to-sequence neural network is also trained through transfer learning, where the network is first trained on the generic dataset, followed by fine tuning on the target data set. Similar to the first network, the word embeddings are tagged with parts-of-speech tags to help the network understand the different parts of speech within the sentences of a particular context.

Both neural networks are utilized to generate questions for a given context and paired with an associated answer into a Q&A pair. The model-generated Q&A pairs are then stored in a knowledge base for use in answering user-query requests.

Attention now turns to a further discussion of the system, devices, components, and methods utilized in the machine learning comparison tool.

System

FIG. 1 illustrates a block diagram of an exemplary system 100 in which various aspects of the invention may be practiced. As shown in FIG. 1, system 100 includes a client device 102 communicatively coupled to an interactive question and answer (Q&A) service 104 through a network 106. The client device 102 includes a browser or rich client application 108 that displays one or more web pages 110 having text passages. A user reading a web page may interact with the interactive Q&A service 104 to obtain additional information regarding the text passage which is in the form of question and answer pairs. In one aspect, the interactive Q&A service 104 is associated with the web site having produced the web page 110.

The interactive Q&A service 104 includes an input and response engine 112, a key phrase to definition/link dictionary 115, a definition lookup engine 116, a knowledge base processing engine 118, a knowledge base 120 including source-based Q&A pairs 122 and model-generated Q&A pairs 124, and an answer search engine 128.

The input and response engine 112 receives requests for the supporting information and responds by providing Q&A pairs. The input and response engine 112 interacts with the definition lookup engine 116, the knowledge base processing engine 118 and the answer search engine 128 based on the type of request (i.e., non-query request, query request) that is received from a client device 102.

The input and response engine 112 utilizes a definition lookup engine 116 to process non-query requests and "What Is" type questions. The definition lookup engine 116 utilizes a key phrase to definition/link dictionary 115 to generate a Q&A pair. The key phrase to definition/link dictionary 115 contains pre-configured mappings of key phrases to a definition and a link. The dictionary 115 may include commonly-used key phrases used in the web pages which are mapped to corresponding definition and a link. The definition is the answer and the link is a URL to additional information.

The input and response engine 122 utilizes a knowledge base processing engine 118 to perform a full-text search on the Q&A pairs in the knowledge base 120. The knowledge base 120 is a central repository that stores source-based Q&A pairs 122 and model-generated Q&A pairs 124. The Q&A pairs in the knowledge base 120 come from different sources. The model-generated Q&A pairs 124 are generated by a deep learning generation engine 132 and the source-generated Q&A pairs 122 generated from documents from various sources, such as documents from websites, such as user comments, feedback, blogs, source documents from other websites, etc.

The knowledge base processing engine 118 performs a weighted elastic search on the entire set of Q&A pairs in the knowledge base 120 to retrieve the most relevant Q&A pairs. The weighted elastic search gives more weight or relevance to documents based on context, past questions, keyword, tag, and question similarity.

The input and response engine 112 utilizes the answer search engine 128 to perform an Internet search utilizing web servers 134. An Internet search is performed when the sources within the interactive Q&A service cannot find Q&A pairs for a particular query request.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Furthermore, the interactive Q&A service may be configured as multiple servers communicatively coupled through one or more networks. The query input engine 112, the definition lookup engine 116, the knowledge base engine processing engine 118, the knowledge base 120 and the answer search engine 128 refer to a computer-related entity, comprising either hardware, a combination of hardware and software, or software.

For example, a component of the interactive Q&A service may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The subject matter disclosed is not limited in this manner. Attention now turns to a more detailed description of the deep learning model architecture.

Deep Learning Networks

Figure 2:
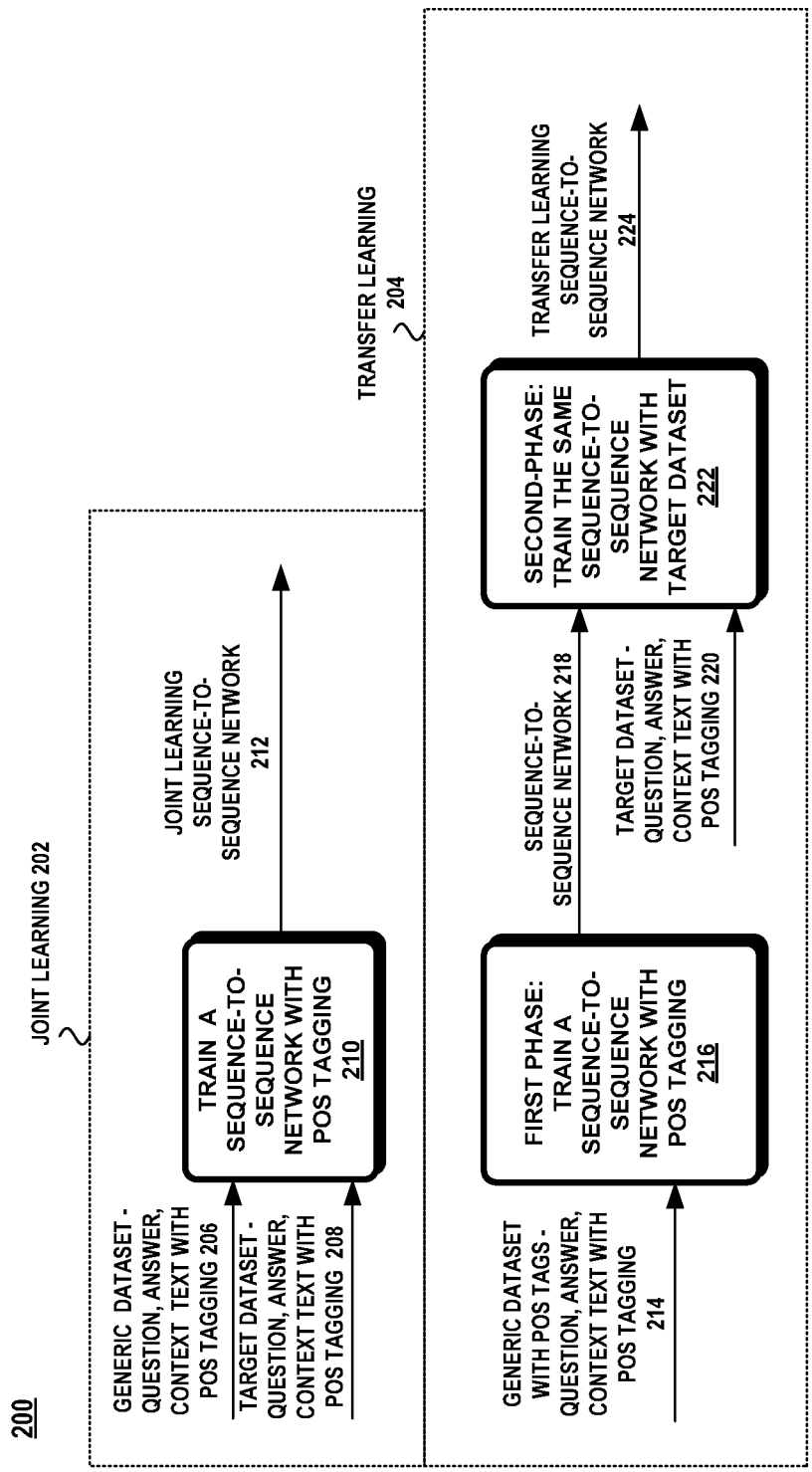
FIG. 2 is a schematic diagram illustrating the training of the deep learning models of an exemplary deep learning framework.
Figure 3:
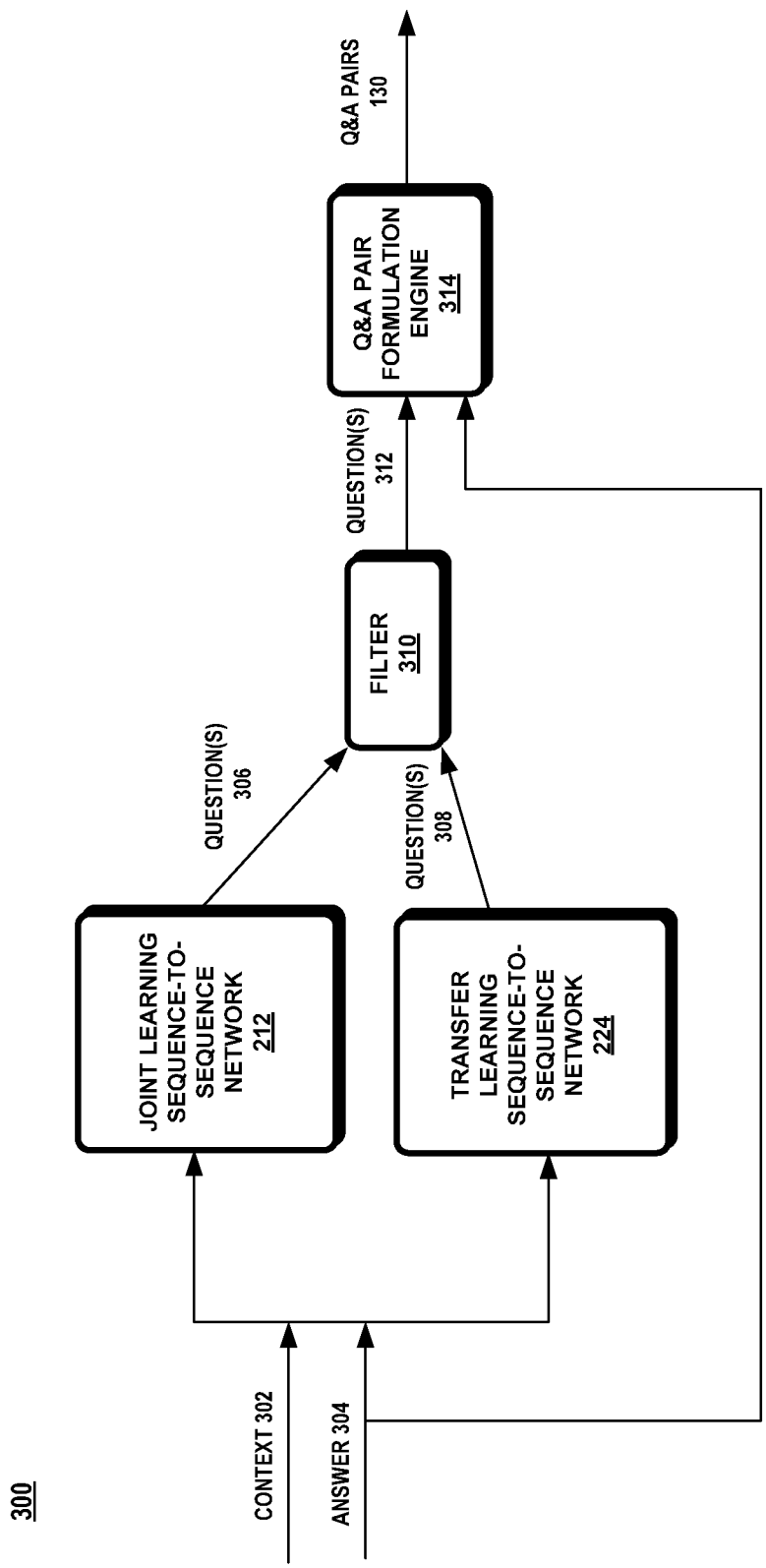
FIG. 3 is a schematic diagram illustrating the use of the deep learning framework in the generation of Q&A pairs.

FIGS. 2 and 3 describe the generation of Q&A pairs using a deep learning framework. The framework contains two sequence-to-sequence models that are both trained on a generic data set as well as a targeted data set. The generic data set has the advantage of having been trained on many human-generated and high-quality Q&A pairs. However, the questions in the generic data set are mostly fact checking questions and do not contain any process-related questions such as "how to" questions. Also, the wording of these questions is very generic. Therefore, this data set is complemented with a targeted data set with mostly "how to" questions written in the language of the targeted context. Each sequence-to-sequence model is trained using either a joint learning technique or a transfer learning technique.

In one aspect, the deep learning framework includes training a first sequence-to-sequence neural network through joint learning with two datasets and training a second sequence-to-sequence network through transfer learning using the same two datasets. Both networks use part of speech tagging in the word embeddings. Sequence-to-sequence learning trains a model to convert a natural language sequence in one domain into a natural language sequence in another domain, such as the conversion of a text passage into questions.

The first sequence-to-sequence neural network is trained using joint learning. Joint learning is a training technique where a neural network learns from two datasets simultaneously. The second sequence-to-sequence model is trained using transfer learning. In transfer learning, the learned features from a pre-trained neural network is transferred to another neural network. Both networks are trained with parts-of-speech tags.

Deep learning applies to a neural network architecture that contains multiple hidden layers that the training data goes through to be processed and transformed into the output. Examples of deep learning networks include artificial neural networks (ANN), recurrent neural networks (RNN), long term memory networks (LSTM), and the like. Deep learning may be supervised or unsupervised. Supervised learning maps an input to an output based on sampled input-output pairs to infer a function from labeled training data. Unsupervised learning learns from data that is unstructured or unlabeled. Deep learning differs from traditional machine learning techniques, such as linear regression, K-means, decision trees, random forest, support vector machines, native bayes classifier, boosted classification trees, and nearest neighbor classifier.

In one aspect, the first and second sequence-to-sequence networks are long short-term memory (LSTM) networks. A LSTM network is a type of recurrent neural network (RNN) that utilizes LSTM blocks or cells. An RNN is a type of sequence-to-sequence model that transforms a sequence of words in one source into another sequence. The LSTM network includes an encoder network and decoder network. The encoder network encodes a variable length source code statement into a fixed-length vector and the decoder network decodes the vector into a variable-length target sentence or question.

The encoder represents words in a text passage using word embeddings. A bi-directional LSTM is used to encode the answer a and the text passage c as follows:

$$\vec{b}_t = \overrightarrow{LSTM_2}(x_t, \vec{b}_{t-1}), \overleftarrow{b_t} = \overleftarrow{LSTM_t}(x_t, \overleftarrow{b_{t+1}}) \quad (1)$$

Here, $x_t$ is denoted as the embedding of the word x at position t in the input. These two equations at (1) correspond to hidden states in forward and backward LSTMs respectively. To get the final representation, the embeddings are concatenated at every time-step as follows: $b_t = [\vec{b}_t; \overleftarrow{LSTM_t}]$.

Using this encoder, the input text passage is represented as a sequence of vectors obtained by concatenating hidden representations at every time-step. The final input representation is a concatenation of the vector sequence representations for the answer a and the text passage c.

The decoder generates the question by emitting a sequence of words, one at a time. At each time-step, the hidden state of the decoder is updated using a LSTM as follows:

$$h_t = LSTM_1(y_{t-1}, h_{t-1}).$$

An attention-based LSTM network is used over the encoder states to obtain the next hidden state in the decoder. A context vector is used which is a weighted sum of the vectors in the input representation and represented as follows:

$$c_t = \Sigma_{i=1 \ldots |x|} a_{i,t} b_i.$$

The weights capture the interaction between the vector in the input representation $b_i$ and the current hidden state $h_t$ and the matrix $W_b$ is learned through back-propagation as follows:

$$a_i = \frac{\exp(h_t^T W_b \, b_i)}{\sum_j \exp(h_t^T W_b \, b_j)}.$$

The next word in the question output is generated by the word that maximizes the softmax function probability based on all the words that are generated previously i.e., y<t and input sentence a and c. The softmax function is a well-known mathematical function that is used to determine the probability distribution of an event over all possible outcomes. The matrices Ws and Wt are learned through back-propagation. Here, y denotes the output question q.

Hence, the output of the decoder may be represented mathematically as:

$$P(y_t|x, y<t) = softmax(W_s \tan h(W_t[h_t; c_t])).$$

Attention now turns to a more detailed description of the deep learning framework.

Turning to FIG. 2, a joint learning sequence-to-sequence network or model 212 is trained from a generic dataset 206 and a target dataset 208 of questions, answers, and text passages to learn the structure of questions from both data sets (block 210). In one aspect, the generic dataset 206 is the Stanford Question Answering Dataset (SQUAD) which contains triplets consisting of a question, a context paragraph, and an answer. The SQUAD dataset is constructed from various articles posted on Wikipedia. The target dataset 208 may be manually generated and consist of questions, answers, and text for an intended context. The target dataset 208 may be constructed from the text of the webpages from which the question and answer pairs are used.

The word embeddings used for training contain part-of-speech tags. The training datasets for each of the sequence-to-sequence models are feature vectors of real numbers generated from word embeddings. Word embeddings map words or phrases into feature vectors of real numbers. Parts-of-speech tags were added to the word embeddings of both datasets in order to identify the parts of speech for each word represented in the feature vector in order to provide additional features for the network while it tries to learn the sentence structure.

A transfer learning sequence-to-sequence network or model 224 is also trained on both a generic dataset with parts of speech tags 214 and a target data set 220 through transfer learning (block 204). A sequence-to-sequence model 218 is first trained on the generic data set 214 and then trained on the target data set 220 in a process that is usually referred to as fine tuning. This two-step training process, referred to as transfer learning, allows the network to first focus on a generic data set to learn how to generate questions in that data set. Learning in this context means obtaining a weight matrix. This weight matrix is then tuned as the network starts to train on the second data set which is more targeted. An alternative approach to transfer learning would be to start with a random weight matrix and then train on the target data set only. However, the final model would usually perform worse in comparison to a model trained via transfer learning. The output of the transfer learning is a fully-trained transfer learning sequence-to-sequence model 224.

In one aspect, the generic dataset used to train the joint learning sequence-to-sequence network 212 is the same generic dataset used to train the transfer learning sequence-to-sequence network 224 and the target dataset used to train the joint learning sequence-to-sequence network 212 is the same generic dataset used to train the transfer learning sequence-to-sequence network 224.

FIG. 3 depicts one aspect of the two sequence-to-sequence networks or models in formulating question and answer pairs. A text passage or context 302 is input with an answer 304 into both the joint learning sequence-to-sequence network 212 and the transfer learning sequence-to-sequence network 224. The text passage or context 302 may be from or associated with a target webpage. The joint learning sequence-to-sequence network 212 and the transfer learning sequence-to-sequence network 224 each generate one or more questions 306, 308 given the inputs.

The generated questions 306, 308 from each network 212, 224 are passed to a filter 310 which filters the questions based on its components, dependency structure, and the overlap of the components and dependency structure with the input sentence for which the question was generated. This filtering is applied since there are cases where a sentence may not independently answer a question. The text passage 302 may contain a sequence of sentences describing a process where the sequence makes sense but an individual sentence does not answer a question. When these sentences are passed through the deep learning sequence-to-sequence networks 212, 224, questions will be generated that make no sense. In order to avoid this situation, the filter 310 will remove questions that do not have at least two overlapping noun phrases and one overlapping verb phrases with the answer that was input into the model.

The generated questions 312 and corresponding answers 304 are then formulated as one or more pairs consisting of a question and its corresponding answer, <Q, A> 130. All the generated <Q, A> pairs are then formatted into a lookup table or dictionary and used as part of the knowledge base.

Interactive Q&A Service

Attention now turns to description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
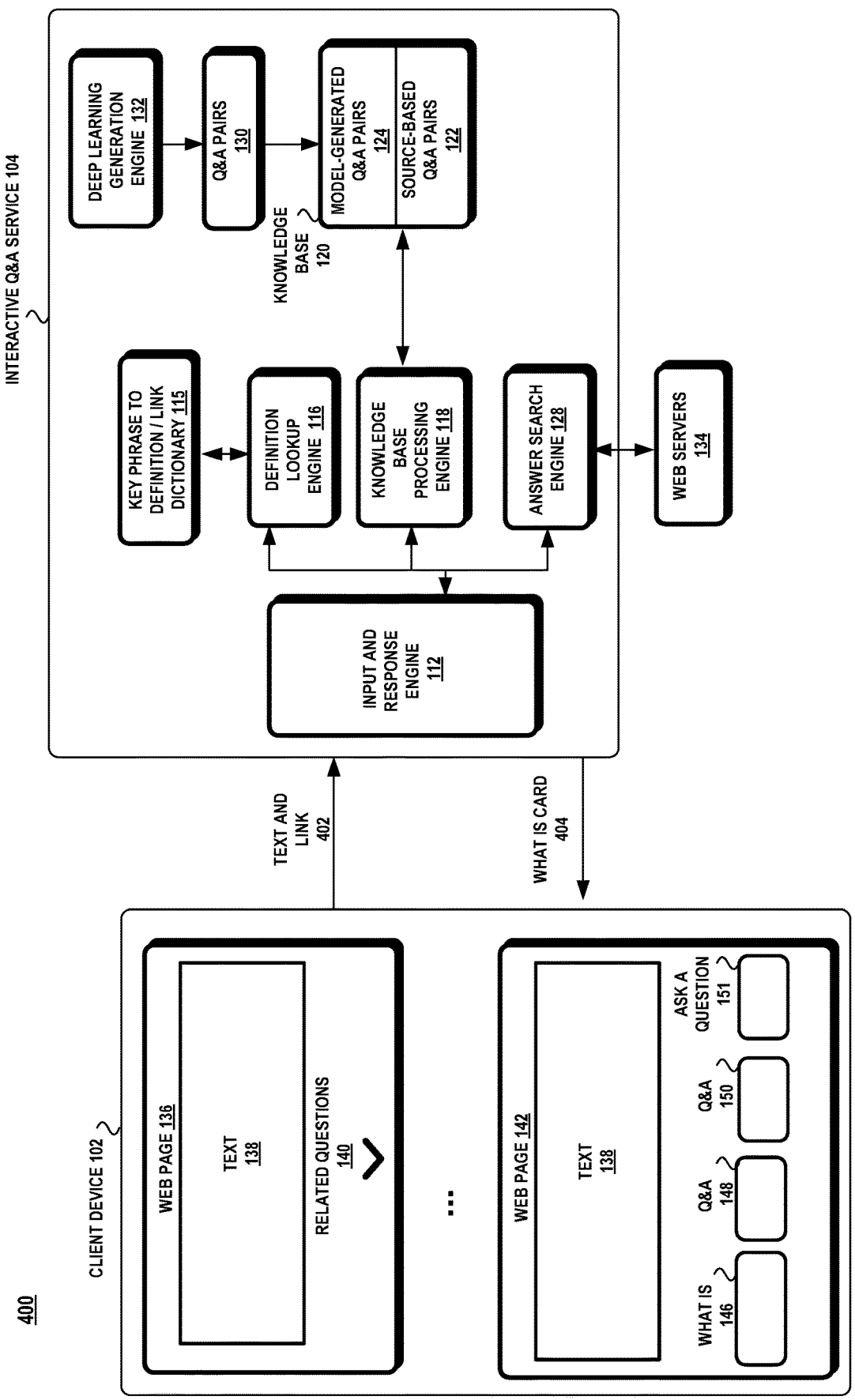
FIG. 4 illustrates a first aspect of the interactive Q&A service which automatically generates Q&A pairs.
Figure 5:
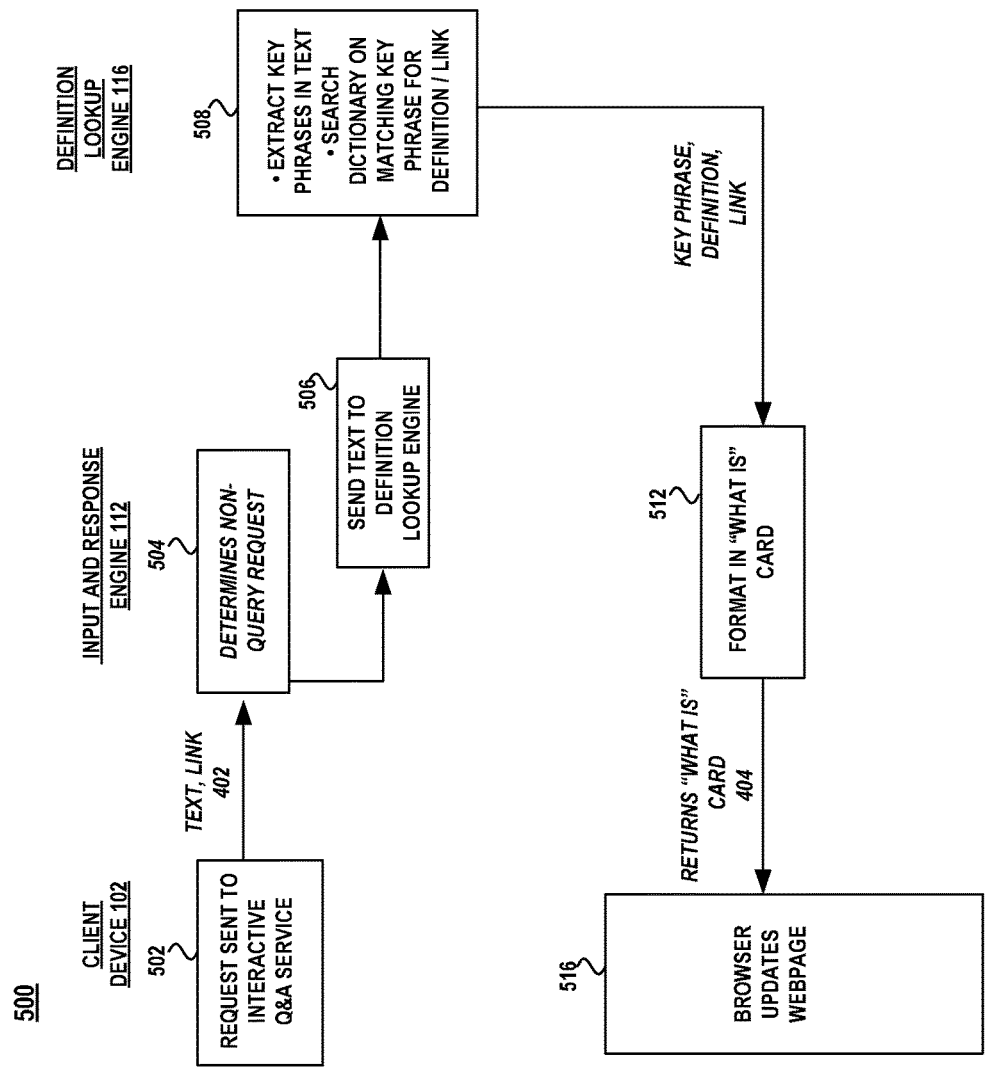
FIG. 5 is a first exemplary method illustrating the interactions between a client device and the interactive Q&A service to provide Q&A pairs for an associated text passage.

FIGS. 4 and 5 illustrate one aspect of a method of generating a Q&A pair formatted as a "What Is" card in response to a non-query request. A client device 102 through a browser receives a web page 136 having text 138 that is displayed to a user. A user interface element is displayed on the web page which the user may activate to obtain questions related to the text 138. In one aspect, the web page 136 may include an icon having the phrase "Related Questions" 140 that when activated by the user facilitates a request to the interactive Q&A service 104 for a Q&A pair (block 502). A request is transmitted to the interactive Q&A service 104 through a HyperText Transfer Protocol (HTTP) request that may include the text passage of the web page and the uniform resource identifier (URI) or link (e.g., uniform resource locator) of the web page 402.

The query input and response engine 112 receives the request and determines that the request is a non-query request (block 504). The query input and response engine 112 transmits the text passage to the definition lookup engine 116 (block 506) which extracts key phrases from the text passage (block 508). The key phrases are used by the definition lookup engine 116 to search the key phrase to definition/link dictionary for a definition matching the key phrase (block 508). The definition and link corresponding to a key phrase are returned to the definition lookup engine 116 which formats the description, link and the key phrase into a "What Is" card (block 512). The "What Is" card contains a question including "What Is" combined with the key phrase and the answer is the definition. The link is included as additional information that a user may want to peruse. The browser updates the web page 142 with the information in the "What Is" card (block 516). The "What Is" card may be displayed in a separate user element 146 as shown in FIG. 4 along with the text passage or text 138. The user elements labeled Q&A 148, 150 contain Q&A pairs for query-related requests and the user interface (UI) element labeled "Ask A Question" 151 is used to illicit a query from the interactive Q&A service 104 which is described in more detail below.

It should be noted that the "What Is" cards are not limited to the exact phrase "What Is" and includes other forms of the question that are semantically similar, such as without limitation "How Is", "What Are", "How To", "Can I", etc.

Figure 6:
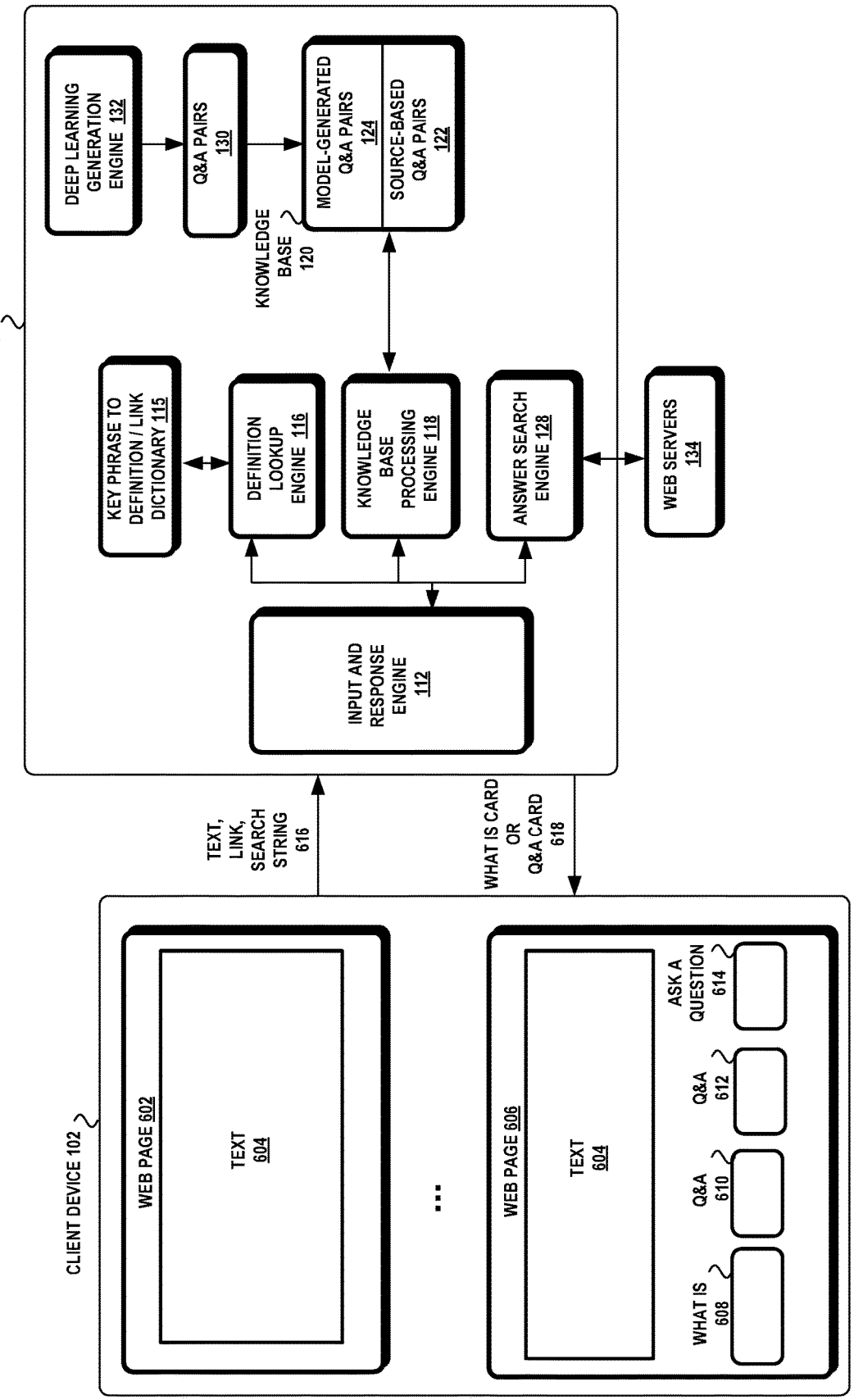
FIG. 6 illustrates a second aspect of the interactive Q&A service to provide Q&A pairs.
Figure 7A:
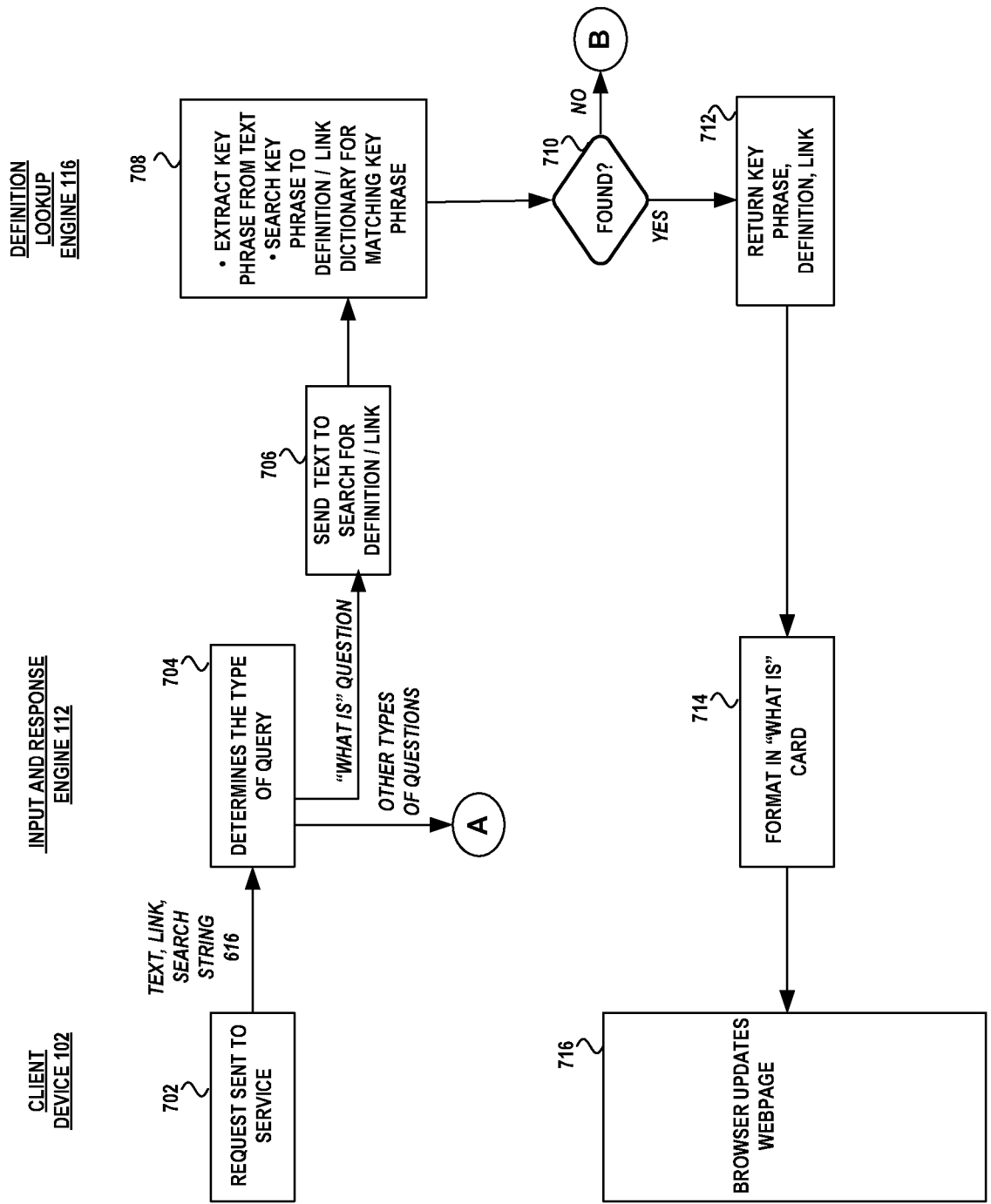
FIGS. 7A-7C illustrate the interactions between a client device and the interactive Q&A service to respond to user requests for Q&A pairs.

Turning to FIGS. 6 and 7A, there is shown an exemplary method of generating Q&A pairs in response to a user-query request. A client device 102 through a browser receives a web page 602 having text 604 that is displayed to a user. The user may request additional information using the "Ask A Question" UI element 614. The user-query request 616 is transmitted to the interactive Q&A service 104 through a HyperText Transfer Protocol (HTTP) request that may include the text passage of the web page, a search string containing the search query, and the uniform resource identifier (URI) or link (e.g., uniform resource locator) of the web page 616 (block 702).

The query input and response engine 112 receives the request and determines that the request pertains to a "What Is" type question (block 704). The input and response engine 112 utilizes a natural language tool to determine the type of the query. In one aspect, the Language Understanding Intelligent Service (LUIS) is used to extract the intention of the user's query.

If the question is a "What is" question, the input and response engine 112 sends the text to the definition lookup engine 116 (block 706). The definition lookup engine 116 extracts key phrases from the text and searches for a definition/link that matches a key phrase (block 712). If a match is found (block 710—yes), then the key phrase, definition and link are formatted into a "What Is" card and returned to the browser. The browser updates the web page 606 by placing the returned information into the "What Is" UI element 608.

Figure 7B:
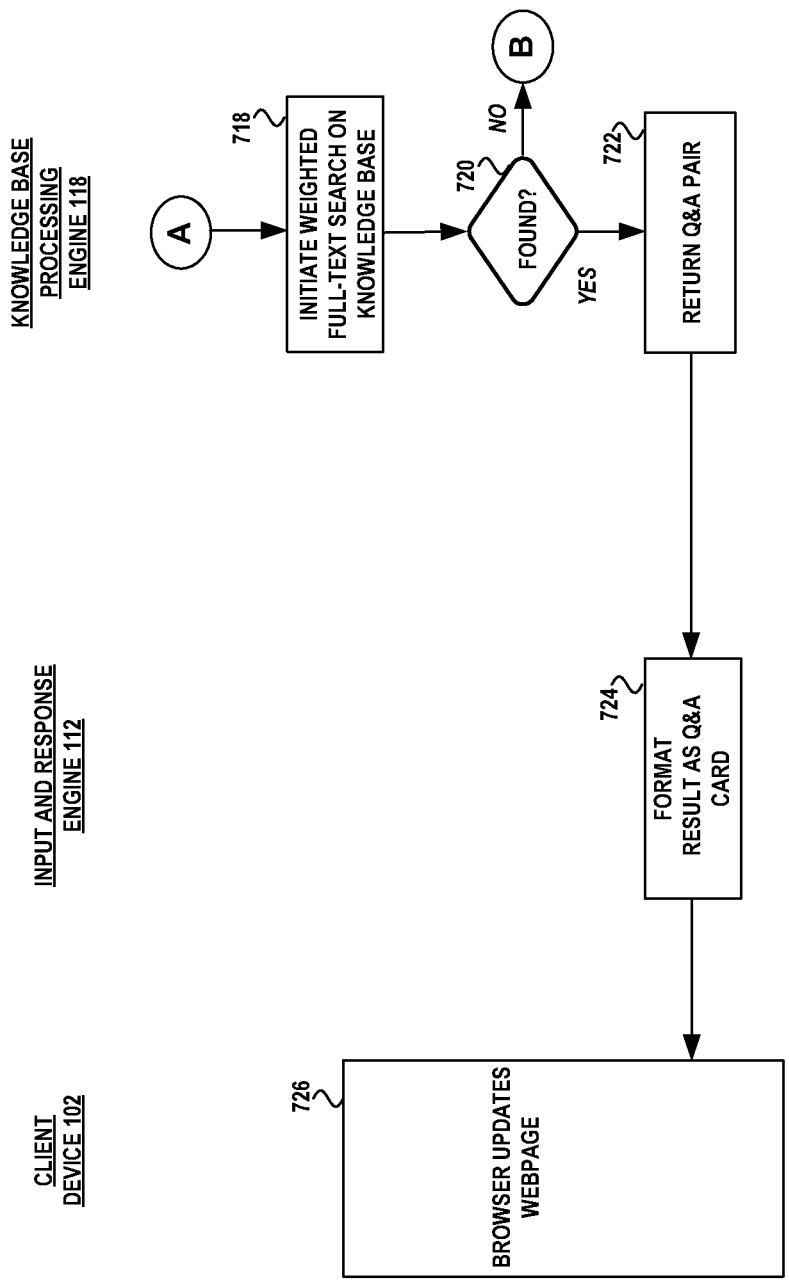
Figure 7C:
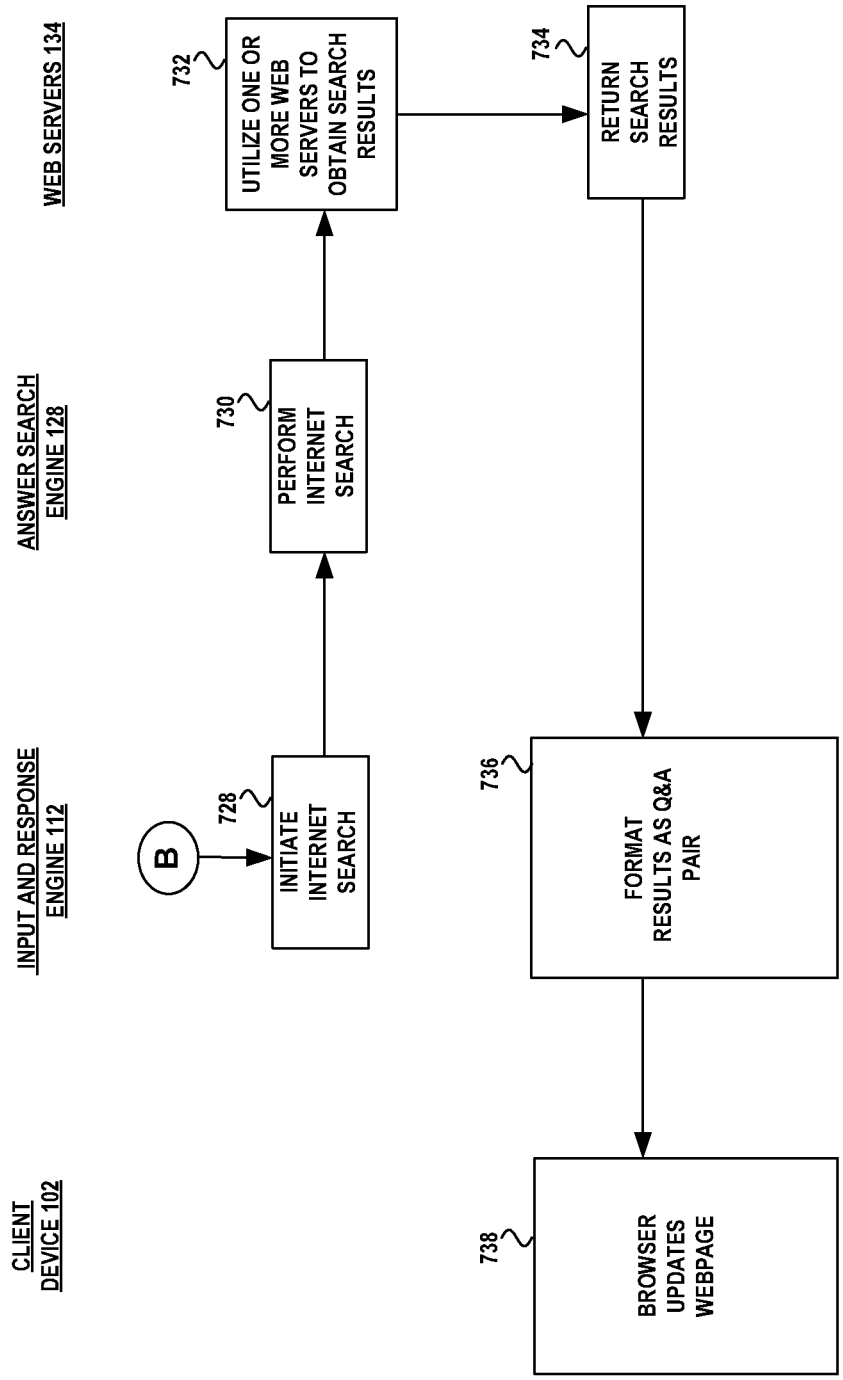

In the event a key phrase is not found in the dictionary, then the interactive Q&A service performs a custom search as shown in FIG. 7C which is described in further detail below.

Referring to FIG. 7B, for other types of questions, other than a "What Is" type request, the input and response engine 112 initiates a full-text search on the Q&A pairs in the knowledge base. The knowledge base processing engine 118 (block 718) initiates a weighted full-text search on all the Q&A pairs in the knowledge base. The search focuses more on the keywords and tags that are extracted from the questions. When the search is successful (step 720—yes), the search results are returned to the input and response engine 112 (block 722). In turn, the input and response engine 112 formats the results in Q&A format (block 724). The browser then updates the web page with the displayed items in the Q&A UI elements 610, 612 (block 726).

Referring to FIG. 7C, in the event the search is not successful (block 720—no), the input and response engine 112 initiates the answer search engine 128 to perform a search through the Internet (blocks 728, 730). The answer search engine 128 obtains search results from searching one or more web servers (block 732). The search results are returned (block 734) to the input and response engine 112 which formats the search results in Q&A format (block 736). The results are returned to the browser which updates the web page 606 with the search results as Q&A pairs in the Q&A UI elements 612 (block 738).

Technical Effect

Aspects of the subject matter disclosed herein pertain to the technical problem of generating question and answer pairs relating to content of a web page in real time. The technical features associated with addressing this problem uses an interactive service that has the capability to generate question and answer pairs from pre-configured Q&A pairs generated from deep learning models, sources associated with the content, and historical web page requests. In the event the pre-configured Q&A pairs do not result in a relevant Q&A pair, the interactive service has the capability to perform a search through the Internet to generate the relevant Q&A pairs.

Exemplary Operating Environment

Figure 8:
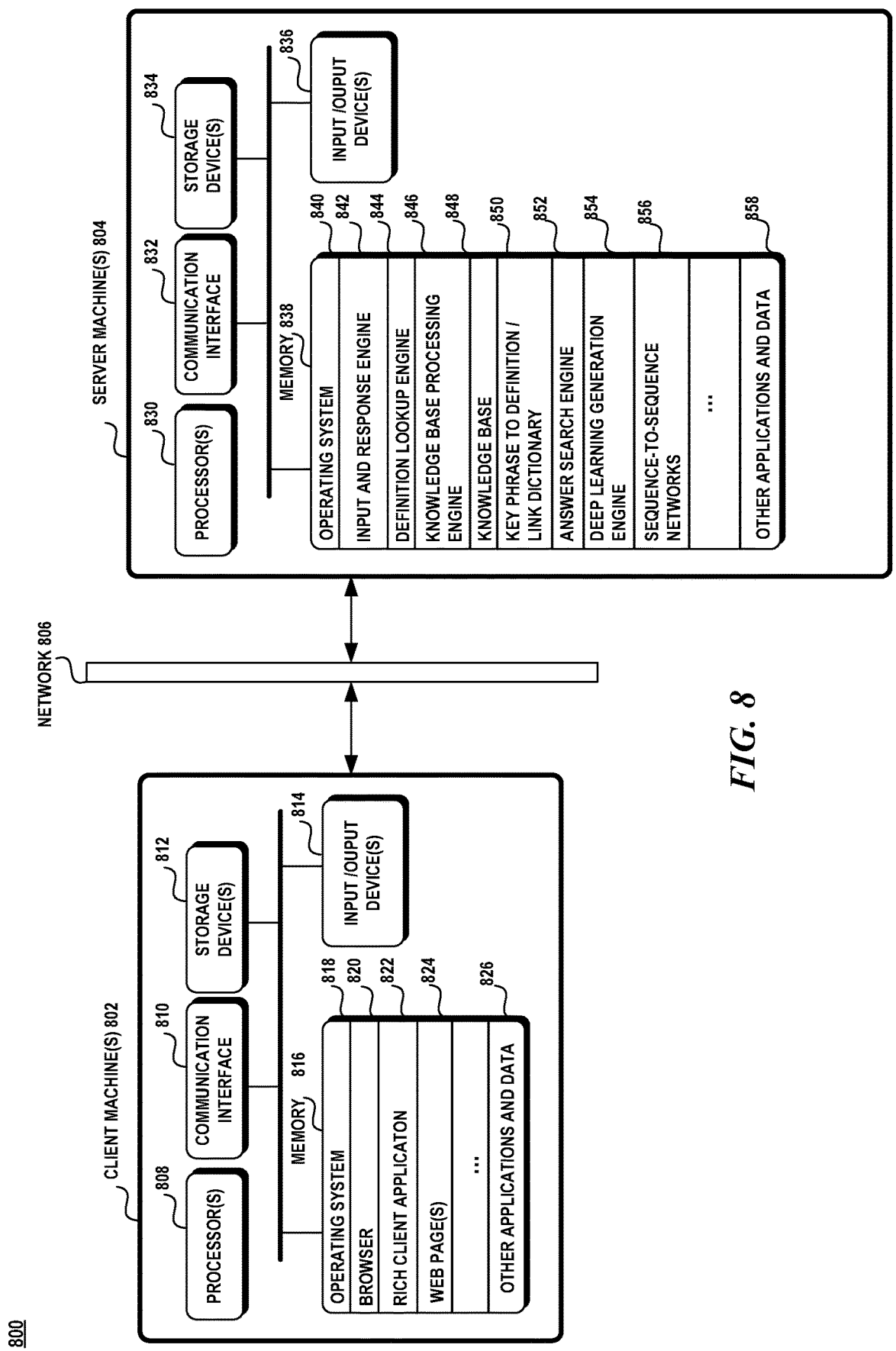
FIG. 8 is a block diagram illustrating an exemplary operating environment.

Attention now turns to a discussion of an exemplary operating embodiment. FIG. 8 illustrates an exemplary operating environment 800 that includes one or more client machines 802 connected to one or more server machines 804 through a network 806. The client machines 802 and the server machines 804 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

A client machine 802 may include one or more processors 808, a communication interface 810, one or more storage devices 812, one or more input and output devices 814, and a memory 816. A processor 802 may be any commercially available or customized processor and may include dual microprocessors and multi-processor architectures. The communication interface 810 facilitates wired or wireless communications between the client machines 802 and other devices. A storage device 812 may be a computer-readable medium that does not contain propagating signals, such as modulated data signals transmitted through a carrier wave. Examples of a storage device 812 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 812 in the client machines 802. The input devices 814 may include a keyboard, mouse, pen, voice input device, touch input device, etc., and any combination thereof. The output devices 814 may include a display, speakers, printers, etc., and any combination thereof.

The memory 816 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 816 may also include one or more external storage devices or remotely located storage devices that do not pertain to propagated signals, such as modulated data signals transmitted through a carrier wave.

The memory 816 may contain instructions, components, and data. A component is a software program that performs a specific function and is otherwise known as a module, program, engine, and/or application. The memory 816 may include an operating system 818, a browser 820, a rich client application 822, one or more web pages 824, and other applications and data 826.

A server machine 804 may include one or more processors 830, a communication interface 832, one or more storage devices 834, one or more input and output devices 836, and a memory 838. A processor 830 may be any commercially available or customized processor and may include dual microprocessors and multi-processor architectures. The communication interface 832 facilitates wired or wireless communications between the server machines 804 and other devices. A storage device 834 may be a computer-readable medium that does not contain propagating signals, such as modulated data signals transmitted through a carrier wave. Examples of a storage device 834 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 834 in a server machine 804. The input devices 836 may include a keyboard, mouse, pen, voice input device, touch input device, etc., and any combination thereof. The output devices 836 may include a display, speakers, printers, etc., and any combination thereof.

The memory 838 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 838 may also include one or more external storage devices or remotely located storage devices that do not pertain to propagated signals, such as modulated data signals transmitted through a carrier wave.

The memory 838 may contain instructions, components, and data. A component is a software program that performs a specific function and is otherwise known as a module, program, and/or application. The memory 838 may include an operating system 840, an input and response engine 842, a definition lookup engine 844, a knowledge base processing engine 846, a knowledge base 848, a recommendation lookup engine 850, an answer search engine 852, a deep learning generation engine 854, the various sequence-to-sequence models 856, and other applications and data 858.

The network 806 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It should be noted that the interactions between a user on a client machine and the interactive Q&A service are not constrained to the particular user interface shown in the figures. Other types of interfaces may be used. For example, a command line interface can be utilized for a user to interact with the interactive Q&A service through a terminal. FIG. 9A illustrates an exemplary command line interface where a user uses the command "$ az ?-q" to ask a question. As shown in FIG. 9A, the question is "how do I output in json" 904. The question is input by a user to a command line interface associated with a web site. The question is asked relative to a documented concept pertaining to controlling resources from a cloud service named Azure. The interactive Q&A service responds using the techniques described above with the answer shown in block 906.

FIG. 9B illustrates another exemplary command line interface where a user poses another question. The user uses the command "$ az ?-q" to ask the question. However, the question is not in the form of an interrogative sentence. As shown in FIG. 9B, the question is "create a vm with key vault" 910. The interactive Q&A service responds using the techniques described above and responds with the answer shown in block 912.

CONCLUSION

A system is disclosed having at least one processor and a memory. The at least one processor is configured to extract a key phrase from a text passage of a web page, obtain a question and answer (Q&A) pair related to the key phrase, the Q&A pair is generated from a deep learning framework including a first neural network and a second neural network, the first neural network jointly trained on a generic dataset and a target dataset, the second neural network trained through transfer learning on the generic dataset and the target dataset, and produce the Q&A pair for display.

The system also incorporates a search for the Q&A pair using a weighted full-text search of Q&A pairs generated from the deep learning framework, uses a search term from a query request as the key phrase to obtain a Q&A pair, and/or performs a weighted full-text search on a repository of Q&A pairs. The first neural network and the second neural network are configured as long short-term memory (LSTM) models. The generic dataset and the target dataset include word embedding with parts of speech tags. The generic dataset contains different types of questions in different contexts and the target dataset contains questions associated with the web page.

A device is disclosed that contains one or more processors and a memory. The device includes at least one module performing actions that generate a dictionary that maps a first key phrase to a definition, the first key phrase associated with content of a web page, the first key phrase representing a subject of a "What Is" type question, the definition representing an answer to the "What Is" type question, generate a knowledge base including source-based Q&A pairs and model-generated Q&A pairs, a source-based Q&A pair derived from documents associated with the web page, the model-generated Q&A pairs generated from one or more neural networks trained on the content of the web page, and obtain at least one request for a Q&A pair associated with a text passage from the web page and respond to the request by providing at least one Q&A pair from the dictionary and/or the knowledge base.

When the request is a non-query request, the at least one module searches the dictionary for a key phrase matching a definition and formulates a "What Is" card including the definition. When the request is a query-request, the at least one module performs a weighted full-text search on the knowledge base using a search term of the request, upon finding a Q&A pair in the knowledge base matching the search term, produces the found Q&A pair. Upon not finding a Q&A pair in the knowledge base, the at least one module performs an Internet search using the search term and formats at least one Q&A pair using results of the Internet search.

Furthermore, the dictionary may include a uniform resource locator (URL) associated with the definition and the at least one module includes the URL associated with the definition in the "What Is" card.

A method that may be practiced on the system and device disclosed herein, obtains a query request for supporting information associated with a text passage of a web page, the query request including a first search term, searches for a question and answer (Q&A) pair matching the first search term in a first repository of pre-configured Q&A pairs, the first repository including Q&A pairs configured from source-based documents and a deep learning framework, the source-based documents associated with content of the web page, the deep learning framework utilizing at least one neural network trained on questions associated with content of the web page; and in the event at least one Q&A pair is found in the first repository that matches the first search term, produce the Q&A pair for display.

The method further comprises obtaining a second request for supporting information associated with the text passage, the second request including a second search term, searching for a Q&A pair matching the second search term in a second repository of pre-configured Q&A pairs, the second repository including Q&A pairs configured from historical web page requests associated with the web page, and in the event at least one Q&A pair is found that matches the second search term, outputting the Q&A pair. The second request may comprise a "What Is" type question or a non-query request.

The deep learning framework generates a Q&A pair from questions output from a first neural network and questions output from a second neural network, the first neural network jointly trained with a generic dataset and a target dataset, and the second neural network trained through transfer learning with the generic dataset and the target dataset. The first neural network and the second neural network are long short-term memory models. When searching for a Q&A pair matching the first search term in the first repository, a weighted full-text search of the Q&A pairs in the first repository is used.

What is claimed:

1. A device, comprising:
one or more processors and a memory;
the memory including at least one module performing actions that:
generate a dictionary that maps a first key phrase to a definition, the first key phrase associated with content of a web page, the first key phrase representing a subject of a "What Is"-type question, the definition representing an answer to the "What Is"-type question;
generate a knowledge base including source-based Question and Answer (Q&A) pairs and model-generated Q&A pairs, a source-based Q&A pair derived from documents associated with the web page, the model-generated Q&A pairs generated from one or more neural networks trained on the content of the web page; and
obtain at least one request for a Q&A pair associated with a text passage from the web page; and
respond to the request by providing at least one Q&A pair from the dictionary and/or the knowledge base.

2. The device of claim 1, wherein the at least one module performs actions that:
when the request is a non-query request:
search the dictionary for a key phrase matching a definition; and
formulate a "What Is" card including the definition.

3. The device of claim 2,
wherein the dictionary includes a uniform resource locator (URL) associated with the definition; and
wherein the at least one module performs action that:

include the URL associated with the definition in the "What Is" card.

4. The device of claim 1, wherein the at least one module performs actions that:
when the request is a "What Is" query-request:
search the dictionary for a key phrase matching a definition; and
formulate a "What Is" card including the definition.

5. The device of claim 1, wherein the at least one module performs actions that:
when the request is a query-request:
perform a weighted full-text search on the knowledge base using a search term of the request; and
upon finding a Q&A pair in the knowledge base matching the search term, produce the found Q&A pair.

6. The device of claim 5, wherein the at least one module performs actions that:
upon not finding a Q&A pair in the knowledge base:
performing an Internet search using the search term; and
formatting at least one Q&A pair using results of the Internet search.

7. A system, comprising:
at least one processor and a memory;
wherein the at least one processor is configured to:
train a first neural network simultaneously with a generic dataset and a target dataset to predict a question given an answer and a context, wherein the generic dataset is derived from generic text passages, wherein the target dataset is derived from text passages of a target website;
train a second neural network to predict a question given an answer and a context, the second neural network trained with the generic dataset first and fine-tuned with the target dataset;
utilize the first neural network and the second neural network to predict questions for a given answer and a given context;
form one or more question and answer (Q&A) pairs from the questions predicted by the first neural network and the second neural network for the given answers; and
upon receipt of a user query for information on content of a webpage, perform a search of the formed Q&A pairs for a Q&A pair that corresponds to the user query.

8. The system of claim 7,
wherein the generic dataset and the target dataset include a plurality of triplets, a triplet including a question, a related textual context, and an answer, and
wherein source of the generic dataset differs from source of the target dataset.

9. The system of claim 8,
wherein each component of the triplet includes a part-of-speech tag.

10. The system of claim 7, wherein the at least one processor is configured to:
perform a full text search of the user query in the formed Q&A pairs.

11. The system of claim 7, wherein the at least one processor is configured to:
filter the questions formulated by the first neural network and the second neural network that do not contain two overlapping noun phrases with the given answer.

12. The system of claim 11, wherein the at least one processor is configured to:

filter the questions formulated by the first neural network and the second neural network that do not contain one overlapping verb phrase with the given answer.

13. The system of claim 7, wherein the first neural network and the second neural network are configured as long short-term memory (LSTM) models.

14. A method performed on a computing device having at least one processor and a memory, the method comprising:
generating a knowledge base of pre-configured Question and Answer (Q&A) pairs, the knowledge base including Q&A pairs configured from source-based documents and Q&A pairs generated from a deep learning framework, the source-based documents associated with content of a web page, the deep learning framework configured to produce Q&A pairs from at least one neural network trained to predict questions given an answer;
obtaining a query for supporting information associated with the content of the web page;
searching for a question and answer (Q&A) pair in the knowledge base corresponding to the query; and
in the event at least one Q&A pair is found in the knowledge base, producing the Q&A pair for display.

15. The method of claim 14, further comprising:
configuring the deep learning framework with a first neural network and a second neural network to predict questions given an answer and a context;
selecting one predicted question from the first neural network or the second neural network; and
forming a Q&A pair from the selected predicted question and the given answer.

16. The method of claim 15, further comprising:
filtering out questions predicted by the first neural network and the second neural network that do not contain two overlapping noun phrases with the given answer.

17. The method of claim 15, further comprising:
jointly training the first neural network with a generic dataset and a target dataset; and
training the second neural network trained with the generic dataset first and fine-tuning the second neural network with the target dataset,
wherein the generic dataset is derived from generic text passages, wherein the target dataset is derived from text passages of a target website.

18. The method of claim 15, wherein the first neural network and the second neural network are long short-term memory models.

19. The method of claim 14, further comprising:
performing a full text search on the knowledge base using the query to find a Q&A pair.

20. The method of claim 14, further comprising:
in the event at least one Q&A pair is not found in the knowledge base, performing an Internet search to obtain a search result.

* * * * *